July 24, 1951  W. L. ROBERTS  2,561,995
ARC WELDING SYSTEM
Filed Jan. 17, 1950
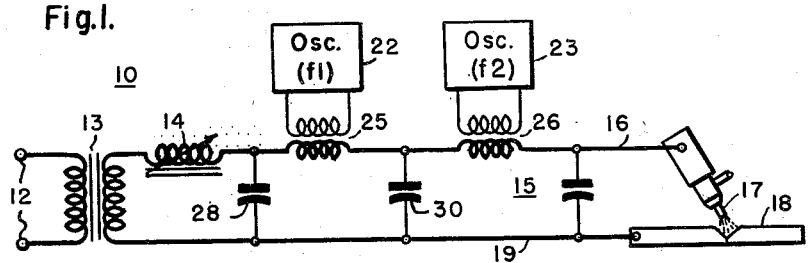
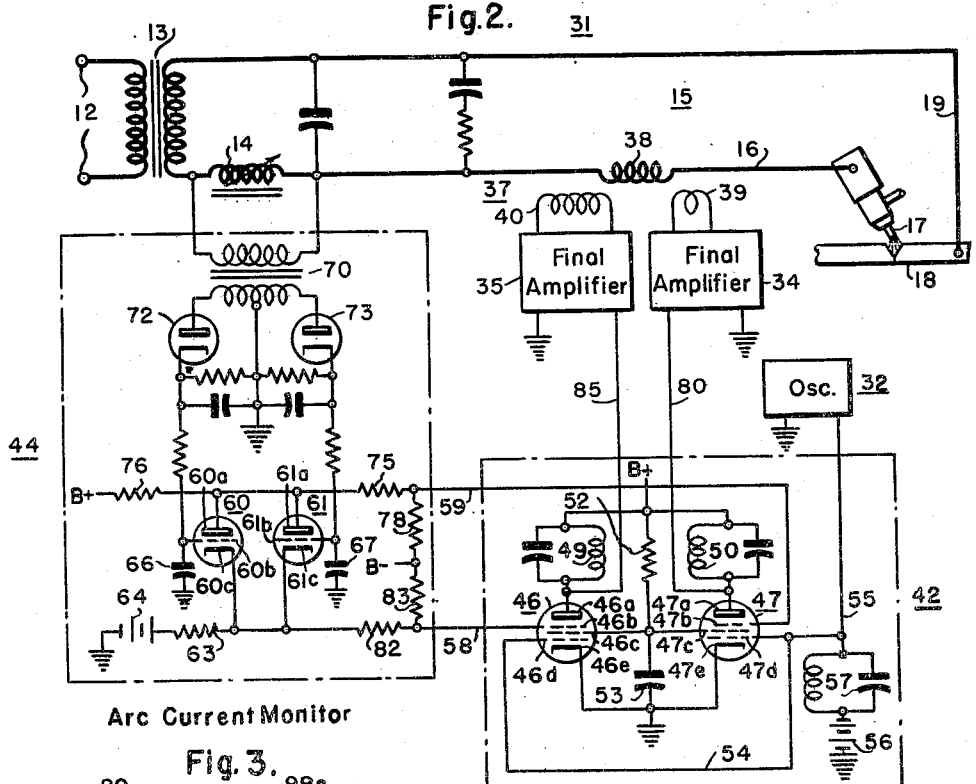
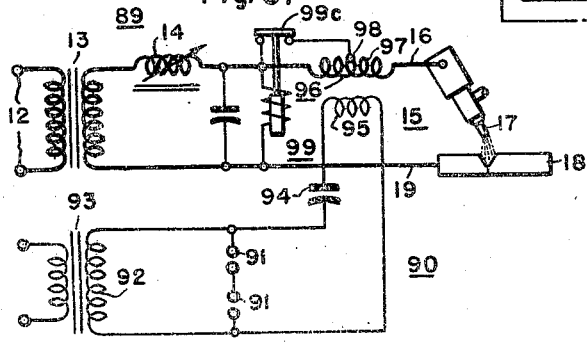
INVENTOR
William L. Roberts.
BY
G. W. Crawford
ATTORNEY Patented July 24, 1951

2,561,995

UNITED STATES PATENT OFFICE 2,561,995

ARC WELDING SYSTEM

William L. Roberts, McKeesport, Pa., assignor to Westinghouse Electric Corporation, East Pittsburgh, Pa., a corporation of Pennsylvania Application January 17, 1950, Serial No. 139,085

13 Claims. (Cl. 315—176)

My invention relates, generally, to arc welding systems, and it has reference in particular to arc initiating and stabilizing systems for use with arc welding circuits.

Generally stated, it is an object of my invention to provide an arc initiating and stabilizing system that is simple and inexpensive to manufacture, and is reliable and effective in operation.

More specifically, it is an object of my invention to provide, in an arc welding system, for applying to an arc circuit, initiating impulses of a relatively high value, and for applying stabilizing impulses of a lower value after an arc is initiated.

Another object of my invention is to provide, in an arc initiating and stabilizing system, for controlling the value of the impulses applied to an arc circuit in accordance with the impedance of said circuit.

Yet another object of my invention is to provide, in an arc initiating and stabilizing system, for producing stabilizing voltage impulses of a reduced value during an arc welding operation.

It is an important object of my invention to provide, in an arc initiating and stabilizing system, for reducing the amount of radiation by reducing the output voltage of the system during a welding operation.

Another important object of my invention is to provide, in an arc initiating and stabilizing system for use with an arc circuit, for changing the effective output impedance of an impulse generator from a relatively high value during open circuit conditions of the arc circuit to a relatively low value during a welding operation, so as to most effectively initiate and stabilize an arc.

Other objects will in part be obvious and will in part be explained hereinafter.

In accordance with one embodiment of my invention, an electronic oscillator of the relaxation type is utilized to produce voltage impulses which are applied to the two valves of an electronic switch. An arc current monitor produces opposed control voltages which are reversed during a welding operation so as to provide for maintaining one valve conductive under open circuit conditions of the arc circuit and the other one conductive during a welding operation. These valves individually control amplifiers which are coupled with the arc circuit through coupling means having, respectively, step-up and step-down relations, for applying relatively high voltage initiating impulses when the arc circuit is open circuited and relatively low voltage stabilizing impulses during a welding operation.

For a more complete understanding of the nature and scope of my invention, reference may be made to the following detailed description, which may be read in connection with the accompanying drawing in which:

Figure 1 is a diagrammatic view of an arc welding system embodying the invention in one of its forms;

Figure 2 is a diagrammatic view of an arc welding system embodying the invention in another of its forms; and Figure 3 is a diagrammatic view of an arc welding circuit embodying the invention in yet another form.

Referring to Fig. 1 of the drawing, the reference numeral 10 may denote, generally, an arc welding system wherein alternating current may be supplied from a suitable source represented by the terminals 12, through a welding transformer 13 and a current-limiting reactor 14 to an arc welding circuit 15 including conductor 16, a welding electrode 17, work 18 upon which a welding operation is to be performed, and conductor 19.

In order to provide for both initiating and stabilizing an arc in the arc welding circuit 15, arc initiating and stabilizing means are provided comprising, for example, oscillators 22 and 23 which may be coupled with the arc welding circuit in any sutiable manner by means of coupling transformers 25 and 26, respectively. The oscillator 22 may be disposed to produce arc initiating impulses, and have a relatively low frequency. It may be of any suitable type being, for example, either of the relaxation type, or capable of producing substantially continuous oscillations. The oscillator 22 may be disposed to produce a relatively high output voltage and have a relatively high output impedance.

The coupling transformer 25 may be disposed to match the high output impedance of the oscillator 22 with the relatively high impedance of the arc welding circuit 15 under open circuit conditions. A bypass condenser 28 may be connected in shunt circuit relation with the welding transformer 13 intermediate the coupling transformer 25 and the welding transformer 13 so as to provide a return circuit for the output of the oscillator 22.

Since the oscillator 22 will be relatively inoperative under the load conditions existing during a welding operation, because of the relatively low impedance of the arc welding circuit loading down the oscillator and preventing it from oscillating, the second oscillator 23 may be disposed to produce impulses for maintaining or stabilizing the arc during a welding operation. The oscillator 23 may, for example, have a relatively high frequency, and may be disposed to have a relatively low voltage output and a relatively low output impedance.

The coupling transformer 26 may be disposed to match the output impedance of the oscillator 23 with the relatively low impedance of the arc welding circuit during a welding operation. A capacitor 30 may be provided intermediate the coupling transformers 25 and 26 to provide a return circuit for the relatively high frequency impulses of the oscillator 23.

In operation, the low frequency oscillator 22 will be matched with the relatively high impedance of the arc welding circuit under open circuit conditions. Its relatively high voltage output will be highly effective in initiating arc between the electrode 17 and work 18 when it is desired to commence a welding operation. The bypass condenser 28 provides a relatively low impedance return circuit for the relatively low frequency output impulses of the oscillator, whereas the bypass condenser 30, being disposed to provide a return circuit for the higher frequency output of the oscillator 23, will offer a relatively high impedance to the low frequency output of the oscillator 22.

As soon as an arc is struck between the electrode 17 and work 18, the impedance of the arc welding circuit will be reduced appreciably, and the oscillator 22 will be rendered substantially inoperative. Because the oscillator 23 has a relatively low output impedance, the coupling transformer 26 provides a matched coupling between the oscillator 23 and the arc welding circuit, and the relatively high frequency, low voltage output impulses of the oscillator 23 will now be effective to stabilize the arc which has been initiated.

Referring to Fig. 2 of the drawing, the reference numeral 31 may denote, generally, an arc welding system wherein alternating current may be supplied from a source represented by the terminals 12 through a welding transformer 13 and a current-limiting reactor 14 to an arc welding circuit 15 including conductor 16, a welding electrode 17, work 18 upon which a welding operation is to be performed, and conductor 19.

In order to provide for both initiating an arc in the welding circuit 15 and stabilizing it after it has been initiated, an impulse generator may be provided comprising an oscillator 32 which may be of any suitable type being, for example, either of the relaxation type which produces periodic voltage impulses, or of the continuous oscillation type.

The oscillator 32 may be utilized to selectively control the operation of amplifiers 34 and 35 which may be coupled with the arc welding circuit 15 by means of a coupling transformer 37 having a secondary winding 38 connected in series circuit relation with the conductor 16, a primary winding 39 having a relatively few turns, and an additional primary winding 40 having a relatively large number of turns. The primary winding 39 may be connected so as to provide a step-up relation between the amplifier 34 and the arc welding circuit, while the primary winding 40 may be connected to provide a step-down relation between the amplifier 35 and the arc welding circuit.

The coupling between the amplifier 34 and the arc welding circuit will, therefore, have a relatively high output impedance characteristic and produce a relatively high voltage, whereas the coupling between the amplifier 35 and the arc welding circuit will have a relatively low output impedance characteristic and produce a relatively low impulse voltage in the arc welding circuit.

In order to provide for selectively rendering either one or the other of the amplifiers 34 and 35 operative, an electronic switch 42 may be provided for applying control voltages to the amplifiers which selectively render them effective. The electronic switch 42 may be utilized in connection with an arc current monitor 44 which produces opposed control voltages, which reverse, depending on whether or not welding current flows in the arc welding circuit.

The electronic switch may, for example, comprise a pair of electronic valve devices 46 and 47 having anodes 46a and 47a; suppressor grids 46b, 47b; screen grids 46c, 47c; control grids 46d, 47d; and cathodes 46e and 47e, respectively. The anodes 46a and 47a may be connected to a source of plate or anode voltage through tuned plate circuits 49 and 50, respectively, while the cathodes 46e and 47e may be connected to ground. The screen grids 46c and 47c may be connected together and maintained at a potential between the plate potential and the ground potential, being connected therebetween by means of a control resistor 52 and a capacitor 53. The control grids 46c and 47c may be connected together to the output of the oscillator circuit 32 by means of conductors 54 and 55. A suitable negative bias may be impressed thereon through a tuned circuit 57 by means of a battery 56.

In order to normally provide for rendering the valve device 46 non-conductive during open circuit conditions of the arc welding circuit, while the valve device 47 is conductive, and reversing these conditions when current flows through the reactor 14, control voltages may be applied to the suppressor grids 46b and 47b through conductors 58 and 59 so as to normally maintain these suppressor grids at negative and positive voltages, respectively, when the welding circuit is open circuited.

This condition may be attained by utilizing a pair of triode valve devices 60 and 61 having anodes 60a and 61a which may be connected to ground through a control resistor 63 and a source of positive bias voltage 64. The control grids 60b and 61b may be connected to ground through capacitors 66 and 67, respectively.

In order to provide for rendering the valve devices 60 and 61 conductive whenever current flows through the reactor 14, a control transformer 70 may be connected across the reactor 14 and provided with rectifier devices 72 and 73 in its secondary circuit for applying positive voltages to the control grids 60b and 61b of the valves 60 and 61, whenever current flows through the reactor 14.

With no current flowing through the reactor 14, the control grids 60b and 61b of the valve devices 60 and 61 will be at substantially ground potential, so that the valve devices will be non-conductive. Accordingly, the conductor 59 which is connected to the source of plate voltage through resistors 75 and 76 and is isolated from the negative terminal of the plate voltage by resistor 78, will be at a positive potential. Since the conductor 58 is connected between ground and the negative terminal of the source of plate voltage, it will be at a negative potential. Accordingly, the valve device 47 will be conditioned for conducting while the valve device 46 will be rendered non-conductive. Accordingly, each time the oscillator 32 produces a voltage impulse, a voltage impulse responsive thereto is applied to the amplifier 34 through conductor 80. Relatively high voltage impulses will, therefore, be introduced into the arc welding circuit 15 through the coupling transformer 37. These impulses will be of sufficiently high value to initiate an arc between the electrode 17 and the work 18 when the electrode 17 is brought adjacent to the work 18.

As soon as current flows in the arc welding circuit, a voltage appears across the reactor 14. This voltage is rectified and applied to the control grids of the valve devices 60 and 61, rendering them conductive. Plate current thereupon flows through the resistor 76 and the valve devices 60 and 61 in parallel, to ground through the resistor 63 and to the negative terminal of the source of plate voltage through resistors 82 and 83. This makes the conductor 58 positive, and the conductor 59 negative. The valve device 46 is thereupon conditioned for conducting, while the valve device 47 will be rendered non-conductive. Accordingly, each time the oscillator 32 produces a voltage impulse, the valve device 46 conducts and applies a voltage impulse to the amplifier 35 through conductor 85. Since the output circuit or the amplifier 35 is coupled to the arc welding circuit through a step-down relation, a relatively low voltage impulse will be produced in the arc welding circuit of sufficient value to maintain the arc between the electrode 17 and the work 18, for each impulse from the oscillator 32.

Referring to Fig. 3 the reference numeral 89 may denote an arc welding system wherein alternating current may be supplied from a source represented by the terminals 12 through an arc welding transformer 13 and a reactor 14 to an arc welding circuit 15, including a conductor 16, a welding electrode 17, work 18 upon which a welding operation is to be performed, and conductor 19.

In order to provide for initiating and stabilizing an arc in the arc welding circuit 15, means such as the oscillator or impulse generator 90 may be provided for producing arc initiating and stabilizing impulses in the arc welding circuit. The impulse generator 90 may be of any suitable type being, for example, of the spark-gap oscillator type having a pair of spark gaps 91 connected in series circuit relation across the secondary winding 92 of a relatively high voltage control transformer 93, which may be energized from any suitable source of alternating current.

In order to produce relatively high voltage impulses, a tuned circuit may be connected in shunt circuit relation with the spark gaps 91 comprising, for example, a capacitor 94 and the primary winding 95 of an air core coupling transformer 96, having a secondary winding 97 connected in series circuit relation with the conductor 16.

In order to provide for varying the output voltage of the impulse generator 90, the secondary winding 97 may be provided with a tap 98 intermediate the ends thereof. Control means such as the voltage relay 99 may be provided for shunting a portion of the turns of the secondary winding 97 during a welding operation and removing the shunt therefrom under open circuit conditions.

For example, the voltage relay 99 may be connected across the arc welding circuit 15 so as to be actuated to the operative position during open circuit conditions of the arc welding circuit when the voltage of the arc welding circuit is at a relatively high value. Contact member 99a of the voltage relay may be connected between the tap 98 and one end of the secondary winding 97 so as to shunt the turns therebetween and reduce the effective output impedance of the impulse generator 90 when the relay drops to the non-operative position, which will occur when the voltage of the arc welding circuit is reduced to the arcing value during a welding operation.

From the above description and the accompanying drawing, it will be apparent that I have provided, in a simple and effective manner, for reducing the impulse voltage of an impulse generator during a welding operation. By changing the effective impedance of the output circuit of the generator, it is possible to readily and effectively reduce the impulse voltage during a welding operation, to a value which is quite sufficient for stabilizing an arc after it has been initiated, and yet maintain a relatively high value of impulse voltage for initiating an arc under open circuit conditions of the arc circuit. By utilizing equipment operating in this manner, radiation from the impulse generator is reduced to a relatively low value during the welding operation and yet the arc is effectively stabilized. By changing the effective output impedance of the impulse generator, it is possible to utilize a minimum amount of power, and yet effectively initiate and stabilize the arc.

Since certain changes may be made in the above-described construction, and different embodiments of the invention may be made without departing from the spirit and scope thereof, it is intended that all the matter contained in the above description and shown in the accompanying drawing shall be considered as illustrative and not in a limiting sense.

I claim as my invention:

1. In combination with an arc welding circuit, oscillator means, coupling means connecting the oscillator means with the arc welding circuit, and control means responsive in accordance with the impedance of the arc welding circuit to vary the effective impedance of the coupling means and vary the output impedance of the oscillator means.

2. In an arc initiating and stabilizing system for use with an arc circuit, oscillator means having a predetermined effective output impedance under open circuit conditions of the arc circuit operable to produce arc initiating impulses of a predetermined value, and control means operable in response to a reduction in impedance of the arc circuit to vary the effective output impedance of said oscillator means to reduce the effective value of the impulses during closed circuit conditions of the arc circuit.

3. An arc initiating and stabilizing system for use with an arc circuit comprising, oscillator means disposed to produce arc initiating and stabilizing impulses, and coupling means coupling the oscillator means to the arc circuit, said coupling means having a predetermined effective impedance under open circuit conditions of the arc circuit, and control means operable in response to a predetermined change of impedance in the arc circuit to reduce the effective output impedance of the oscillator means during closed circuit conditions of the arc circuit.

4. An arc initiating and stabilizing system for use with an arc welding circuit comprising; a first oscillator having a relatively low impulse frequency, a high output voltage and a relatively high output impedance; a second oscillator having a relatively high impulse frequency, a relatively low output voltage and a relatively low output impedance; and coupling means coupling said oscillator to the arc welding circuit, said first oscillator being effective under open circuit conditions of the arc welding circuit to produce impulses of sufficiently high voltage to initiate an arc and being rendered inoperative by the loading effect of reduced impedance of the arc welding circuit during a welding operation, said second oscillator having a sufficiently low output impedance so as to be effective to produce impulses of sufficiently high voltage during welding to stabilize an arc.

5. In an arc initiating and stabilizing system for use with an arc welding circuit, an oscillator operable to produce relatively high voltage impulses, variable coupling means connecting the oscillator to the arc welding circuit, and control means operable to vary the coupling means in accordance with the impedance of the arc welding circuit to reduce the voltage of the impulses applied to the arc welding circuit during a welding operation.

6. The combination with an arc welding circuit, of an oscillator coupled with the arc welding circuit to produce arc initiating and stabilizing impulses therein, and control means operable in response to closed circuit conditions of the arc welding circuit during welding to reduce the effective value of said impulses.

7. The combination with an arc welding circuit, of oscillator means, coupling means connecting the oscillator means to the arc welding circuit comprising a transformer having a secondary winding connected in the arc welding circuit, and control means including a relay responsive to the voltage of the arc welding circuit connected to shunt a portion of the secondary winding during a welding operation.

8. The combination with an arc circuit, of oscillator means disposed to produce arc initiating and stabilizing impulses, circuit means including relatively high impedance coupling means coupling the oscillator means to the arc circuit to apply initiating impulses thereto, additional circuit means including relatively low impedance coupling means coupling the oscillator means to the arc circuit to apply stabilizing impulses thereto, and control means responsive to an electrical condition of the arc circuit operable to render said first-mentioned circuit means effective under open circuit conditions of the arc circuit and said additional circuit means effective under closed circuit conditions of the arc circuit.

9. An arc initiating and stabilizing system for use with an arc circuit comprising, an oscillator, a coupling transformer having a secondary winding disposed to be connected in the arc circuit and a pair of primary windings disposed to provide relatively high and relatively low impedance output circuits coupled with the arc circuit, respectively, and circuit means including switch means selectively responsive to an electric condition of the arc circuit disposed to couple the oscillator with the high impedance output circuit during open circuit conditions of the arc circuit and with the low impedance output circuit during welding.

10. In combination with an arc circuit, a coupling transformer having a secondary winding connected in the arc circuit and a pair of primary windings providing in relation with the secondary winding step-up and step-down ratios respectively, amplifier means connected to the step-up primary winding, additional amplifier means connected to the step-down primary winding, an oscillator, and circuit means coupling the oscillator to said amplifiers including switch means normally disposed to render the first-mentioned amplifier means operative, and operable in response to commencement of a welding operation to render the additional amplifier means operative.

11. The combination with an arc circuit, of an oscillator, circuit means coupling the oscillator to the arc circuit including relatively high impedance and relatively low impedance output circuits, and switch means operable in response to an electrical condition of the arc circuit to transfer the coupling of the oscillator from the high impedance circuit to the low impedance circuit.

12. In an arc initiating and stabilizing system, a pair of amplifiers, one having a relatively high impedance coupling with an output circuit and the other having a relatively low impedance coupling with said output circuit, an oscillator operable to produce voltage impulses, and switch means operable in response to the flow of current in an arc circuit to apply voltage impulses to said one or said other of the amplifiers in response to the oscillator impulses depending on whether or not a predetermined value of current flows in said arc circuit.

13. In an arc initiating and stabilizing system for use with an arc welding circuit, a coupling transformer having a secondary winding disposed to be connected in the welding circuit and having a pair of primary windings, one of which provides a step-up relation with the secondary winding and the other of which provides a step-down relation therewith, an amplifier connected with each of said primary windings, control means operable to produce a control voltage in response to the flow of current in the arc welding circuit, an oscillator disposed to produce voltage impulses, and switch means selectively responsive to the production of said control voltage disposed to apply voltage impulses to said one amplifier or said other amplifier in response to impulses from the oscillator depending on whether or not current flows in the arc welding circuit.

WILLIAM L. ROBERTS.

REFERENCES CITED

The following references are of record in the file of this patent:

UNITED STATES PATENTS

| Number | Name | Date |
| --- | --- | --- |
| 2,399,331 | Denault | Apr. 30, 1946 |
| 2,470,668 | White | May 17, 1949 |
| 2,495,183 | Roberts | Jan. 17, 1950 |